United States Patent [19]

Wolinski et al.

[11] 4,126,504
[45] Nov. 21, 1978

[54] ADHESIVE COMPOSITIONS AND METHOD EMPLOYING SAME

[75] Inventors: Leon E. Wolinski, Cheektowaga; Peter D. Berezuk, Buffalo, both of N.Y.

[73] Assignee: Pratt & Lambert, Inc., Buffalo, N.Y.

[21] Appl. No.: 763,145

[22] Filed: Jan. 27, 1977

[51] Int. Cl.$^2$ .................. B32B 7/00; C08L 63/00
[52] U.S. Cl. .................. 156/310; 156/314; 156/331; 156/330; 156/332; 260/836; 260/881; 260/837 R; 260/885; 260/879; 428/307
[58] Field of Search .............. 156/305, 331, 310, 332, 156/314, 334, 330; 427/302; 428/307, 420; 260/885, 881, 879, 836, 837 R

[56] References Cited

U.S. PATENT DOCUMENTS

| | | | |
|---|---|---|---|
| 2,703,776 | 3/1955 | Leader et al. | 260/885 |
| 2,894,932 | 7/1959 | Bäder et al. | 156/332 |
| 2,928,804 | 3/1960 | Foster et al. | 156/310 |
| 3,249,656 | 5/1966 | Kalinowski | 260/885 |
| 3,262,803 | 7/1966 | Bäder et al. | 260/885 |
| 3,315,380 | 4/1967 | Mack et al. | 156/310 |
| 3,395,105 | 7/1968 | Washburn et al. | 156/330 |
| 3,496,250 | 2/1970 | Czerwinski | 260/836 |
| 3,509,111 | 4/1970 | Samour | 156/332 |
| 3,591,438 | 7/1971 | Toback et al. | 156/310 |
| 3,666,597 | 5/1972 | Parnell | 156/305 |
| 3,725,504 | 4/1973 | Owston | 156/327 |
| 3,832,274 | 8/1974 | Owston | 260/879 |
| 3,994,764 | 11/1976 | Wolinski | 156/332 |
| 4,076,671 | 2/1978 | Bright | 260/885 |

OTHER PUBLICATIONS

Nowak et al., "Unsaturated Polyesters", Kirk–Othmer ECT, vol. 20, pp. 825–826 © 1969.
Anon., *OR–CHEM TOPICS*, Rohm & Haas Publication, Fall 1965.
Sorenson et al., *PREPARATIVE METHODS OF POLYMER CHEMISTRY*, Interscience, pp. 161–162 & 183–184 © 1961.
*ENCYCLOPEDIA OF POLYMER SCIENCE AND TECHNOLOGY*, vol. I, Wiley and Sons © 1964, p. 264.

*Primary Examiner*—William A. Powell
*Assistant Examiner*—J. J. Gallagher
*Attorney, Agent, or Firm*—Christel & Bean

[57] ABSTRACT

Improved, fast curing adhesives, with and without fillers, and articles bonded therewith are provided. The adhesive comprises a first part made up of a thermoplastic, non-reactive elastomeric polymer dissolved in an addition polymerizable combination of an acrylic or methacrylic monomer, a copolymerizable monomer containing at least one free carboxylic acid group, and a non-activated free radical addition polymerization catalyst system, and a second part comprising an activator for the free radical catalyst system. Exemplary of such a formulation is a first part made up of a elastomer, e.g. an acrylonitrile/butadiene rubber dissolved in a mixture of acrylic acid and methyl methacrylate, each of the three components being present in equal amounts. About 5 weight percent benzoyl peroxide and about 0.1 weight percent hydroquinone are dissolved in the mix. The resulting formulation has a high degree of relative stability in the absence of an activator for the benzoyl peroxide. An appropriate second part, i.e., activator, comprises a tertiary amine, such as N,N-dimethyl aniline, diethyl aniline, N,N-dimethyl-p-toluidine. The second part may also contain an oxidizable heavy metal salt or other known acceleration for such free radical catalyst systems. In one modification the activator may be encapsulated in insoluble, rupturable microspheres to form a one-liquid adhesive.

83 Claims, No Drawings

ADHESIVE COMPOSITIONS AND METHOD EMPLOYING SAME

CROSS REFERENCE TO RELATED APPLICATION

This application is related to applications, Ser. No. 586,655 now U.S. Pat. No. 3,994,764 to Wolinski filed June 13, 1975 now U.S. Pat. No. 3,994,764 and to Ser. No. 705,333 to Wolinski et al filed July 14, 1976. Both of said applications are assigned to Pratt and Lambert, Inc. the assignee of the present application and said applications are hereby incorporated by reference herein.

BACKGROUND OF THE INVENTION

The present invention relates to adhesives. More particularly it relates to novel adhesive compositions which are curable to form a strong adhesive bond. Still more particularly it relates to fast cure adhesives which form bonds to a wide variety of substrata and which attain exceptional bond shear strengths and peel strengths. It also relates to an adhesive bonding technique appropriate to such adhesives and to articles and materials bonded thereby.

There is considerable interest in the general field of adhesives in formulations which form rapid bonds. Fast bonding adhesives have received much attention, particularly for rapid mass production of a wide range of products. Until recently adhesive bonding has been relatively slow and has been a substantial impediment to production rates where such operations have been employed.

There is in the adhesive art an interest in adhesive formulations effective to bond the widest possible range of substrata, as well. It is most inconvenient to employ different adhesives for each different substrate of interest, and considerable effort has been devoted to the development of "broad spectrum" adhesives which form high strength bonds to a broad diversity of materials.

An ancillary problem has been the requirement of most common adhesives for meticulous surface preparation of the substrate to be bonded. Extensive cleaning, degreasing, roughening, and priming operations are quite time consuming and expensive and any development which moderates or reduces such requirements offers a substantial benefit.

Many adhesive bonding operations impose a requirement for both high peel strength and high shear strength. The combination of both characteristics in a single bond has not heretofore been readily attainable.

Heretofore, many of the best adhesives for overall performance have been solution or emulsion systems, requiring the slow evaporation of water or the hazardous evaporation of flammable and/or toxic solvents. Such bonding systems also result in less than acceptable results when liquid - tight and or vapor - tight bonds are required. The evaporation of a solvent or the like may leave the adhesive permeable to liquids or vapors. Evaporative systems are also difficult to use, requiring great experience and judgement in determining when the adhesive is ready for bonding. If parts are joined too soon, the water or solvent yet to be evaporated may cause a weak bond as it migrates to the joint edge, while too much drying may result in a loss of adhesion. In either case poor bond strength results.

Hot melt adhesives offer excellent performance in some operations, but involve considerable equipment and labor problems and lack adhesion to a number of materials.

In the foregoing context, there has been growing interest in curing-type adhesive systems, but there have been considerable difficulties in this area as well.

In order to develop adequate storage stability, complex two part systems have often been required, which in turn have imposed difficulties in mixing the segregated components adequately, followed by a limited "pot life." If the cure time is sufficiently long to facilitate adequate, thorough blending, rapid bonding cannot be attained. If the cure time is short enough to be useful for mass production operations, adequate mixing and application operations are difficult. Elaborate equipment and complex operations have been developed which add greatly to the expense.

Curable adhesive systems are known where a dormant or inactive curing catalyst is employed which may be activated by heat or radiation after parts to be bonded are coated with the formulation and joined. While such adhesives offer great advantages in numerous contexts, the need to hold the parts in place during activation and cure can add considerably to the expense, while the investment in heating or radiation equipment is also expensive. Such techniques are not as rapid as the art requires and are not applicable at all to some substrata and some forms of adhesive joints. Radiation also introduces a hazard to personnel.

A relatively recent development in the art is the technique of formulating curable adhesive systems with a dormant or inactive curing catalyst which can be activated by contact with a catalyst activator compound. It is now possible to formulate such adhesives which cure rapidly. Such systems have suffered, however, from an inability to attain high shear strength and high peel strength in the same formulation. Most such systems also require sacrificing bond strength and/or cure speed in order to attain acceptable levels of adhesion to a broad variety of substrata. Such formulations have also proved more sensitive than desirable to surface preparation of the substrate, and have generally resulted in bonds exceptionally susceptible to heat. Heat susceptibility is a severe detriment in the manufacture of articles which are to be, for example, painted, where the paint is subjected to one or more bake cycles.

It is readily apparent that it would be highly desirable to obtain an adhesive which, in a single formulation, bonded a wide diversity of materials, with high strength joints, both with respect to shear strength and peel strength, which requires no solvent or other volatile ingredient, which attains bond strength very rapidly but has a long shelf life and pot-life before the joint surfaces are mated, which is effective with minimal or no surface preparation, and which requires no elaborate or expensive equipment for use. To attain all these features and to attain a bond not overly sensitive to heat as well is more desirable still. These and yet other objects are attained by the present invention wherein a non-reactive elastomeric polymer is dissolved in an acrylic monomer and a copolymerizable carboxylic acid group containing monomer, and the solution thus formed is combined with an unactivated, dormant free radical polymerization catalyst to form an adhesive, and an activator for the dormant catalyst is separately provided.

In use, the activator is applied to at least one of the surfaces to be joined, the adhesive is applied to at least one of the surfaces to be joined and the surfaces are mated and held in contact until the adhesive bond is formed. By such a technique, all the foregoing objects may be attained. Heat susceptibility of the adhesive bond is enhanced by the inclusion in the adhesive of a non-reactive epoxy resin.

DESCRIPTION OF THE INVENTION

In the copending application Ser. No. 586,655 now U.S. Pat. No. 3,994,764 to Wolinski, a fast curing adhesive two part composition is disclosed. The first part consists of a thermoplastic non-reactive urethane polymer dissolved in an addition - polymerizable combination of (a) an acrylic or methacrylic monomer and (b) a copolymerizable monomer containing at least one free carboxylic acid group and (c) a non-activated free radical addition polymerization catalyst system. The second part comprises an activator for the free radical catalyst system. In the present invention the inventors have found that a non-reactive elastomer may be substituted for the non-reactive thermoplastic polyurethane of application Ser. No. 586,655 now U.S. Pat. No. 3,994,764 and obtain a highly effective adhesive.

THE ELASTOMER

Any elastomeric polymer may be used in the adhesives of the present invention, so long as the polymer is non-reactive. As employed in the present disclosure, the term "non-reactive," as applied to the elastomeric component of the adhesives, means that the polymer contains no activated double bond capable of free radical polymerization, such as an acrylic double bond. "Elastomeric" is defined as having the ability of a polymer strip to return to its approximate initial length after elongation to below its breaking or fracture point.

Examples of the elastomeric materials include rubbery polymers and copolymers derived from diolefins such as butadiene-1,3; isoprene; 2,3-dimethylbutadiene-1,3; 1,4-dimethylbutadiene -1,3; piperylene; hexadiene -1,3; 2-methyl pentadiene 1,3; 2- methyl-3-butyl butadiene-1,3; 2,3-diethyl butadiene. The rubbery material may consist entirely of a natural rubber or a synthetic rubber diolefin i.e. a homopolymer, although the diolefin rubbery polymers usually contain from about 5% to 40% of an olefinic modifying comonomer, such as, e.g. styrene, acrylonitrile, methyl methacrylate. Thus, such rubbers as styrenebutadiene, butadiene-styrene-acrylonitrile, neoprene rubber, butyl rubber, silicone rubbers preferably other than dimethylsiloxanes, polysulfide rubber, polyacrylate rubber, pyridine butadiene rubbers, chlorosulfonated polyethylene etc. may be used. The styrene-butadiene and acrylonitrile-butadiene rubbers are now generally referred to as SBR and NBR rubbers. Additionally, grafted rubbers may constitute the elastomeric polymer of the adhesive system. Such rubbers are prepared by grafting vinyl monomers, e.g. those mentioned above, onto the rubbery polymer backbone by methods known in the art, e.g. emulsion polymerization. In addition to the rubbery material exemplified by the aforesaid, other elastomers which are non-reactive in the sense used herein may be employed, such as for example poly ethers of epichlorohydrin and polyurethanes. The elastomers employed do not react to any notable degree with any component of the adhesive composition.

THE ACRYLIC MONOMER

Free radical addition polymerizable acrylic monomers are well known to those of ordinary skill in the art, and for purposes of the present invention conform to the general formula:

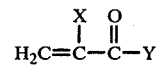

where X may be hydrogen, methyl, ethyl, or a halogen such as chlorine. Among these it is preferred that X be hydrogen or methyl. Y in the above formula may in turn be represented by the general formulae:

where R and R' each represent hydrogen, alkyl groups of up to 8, and occasionally more, carbon atoms and such alkyl groups substituted with hydroxyl, amino, halo, or aryl substituents.

Those of ordinary skill in the art will readily recognize that the foregoing formulae define acrylic and methacrylic esters, acrylic and methacrylic amides, and variously substituted variations thereof as preferred acrylic monomers. Acrylic acid and methacrylic acid, and other carboxylic acid functional monomers comprise a special case hereinafter discussed in detail and are not intended for inclusion in the group of acrylic monomers here defined. The esters will include, as preferred members of the group, methylacrylate, methylmethacrylate, ethylacrylate, ethylmethacrylate, propylacrylate, propylmethacrylate, n-butylacrylate, n-butylmethacrylate, iso-butylacrylate, iso-butylmethacrylate, and the like. In some circumstances, higher molecular weight esters, such as 2-ethylhexylacrylate and the like, and substituted, particularly hydroxy - or amino-substituted alkyl acrylates and methacrylates, exemplified by, for example, 2-hydroxyethylacrylate and N-methylaminoethyl methacrylate, are useful and desirable. The amides include acrylamide and methacrylamide, and the corresponding N substituted amides.

Still other acrylic monomers may be employed, including acrylonitrile, methacrylonitrile, and diacrylic or dimethacrylic esters and amides, or ester-amides, resulting from the reaction of the acids with a diol, diamine, or the like, such as ethylene glycol dimethacrylate, ethylenediamine dimethacrylamide, acid salts of quarternized ammonium alkyl acrylates and methacrylates, and the like.

Mixtures of two or more of such acrylic monomers are also contemplated in the practice of the present invention.

THE ACID MONOMER

Free radical addition polymerizable carboxylic acid group containing monomers copolymerizable with the aforesaid acrylic monomers constitute the second monomer component of the adhesive.

As will be readily recognized by those of ordinary skill in the art, acrylic acid and methacrylic acid, as well as esters and amides thereof substituted with carboxylic acid groups, meet the foregoing requirements.

Acrylic acid and methacrylic acid are the preferred acid monomers in the practice of the present invention. Other acid monomers of interest which will find use in the practice of the present invention include, for example, the half esters of 2-hydroxyethyl acrylate, or other reactive acrylic species, with dicarboxylic acids, such as maleic, itaconic, fumaric, oxalic, phthalic, and terephthalic acids, mixtures thereof, and the like.

THE CATALYST

Among the cure catalysts that are effective in the adhesives of the present invention are the free radical addition polymerization catalysts which are not active at room temperatures in the absence of an activator component. Such activator components are not included in the adhesive formulation, but rather are dealt with as hereinafter discussed. The catalysts of interest can be defined more precisely as those which have a half life at 85° C. of at least one half hour. A preferred such catalyst is benzoyl peroxide, but those of ordinary skill in the art will recognize that other free radical catalysts may also employed.

THE ADHESIVE FORMULATION

The foregoing components are formulated into an adhesive by dissolving the elastomer and the catalyst into a mixture of the acrylic monomer component and the acid monomer component. In the solution thus formed, the elastomer component will comprise about 10 to 70, preferably about 10 to 30 weight percent; the catalyst will comprise about 0.1 to 5.0, preferably about 2 to 4 weight percent, and the balance will be the acrylic monomer acid monomer blend. These two monomer components should be proportioned in such fashion that the acid monomer comprises at least about 5.0 weight percent of the total formulation, preferably about 5 to 35 weight percent. Since the acid monomer will generally be relatively expensive, it is ordinarily not preferred to use more than about 20.0 weight percent, but there is no reason greater amounts cannot be employed, up to as much as about 67 percent of the adhesive, or even more if desired. The acrylic monomer is preferably 30 to 50 weight percent.

The basic adhesive composition thus formulated is storage stable for considerable periods of time, but where prolonged shelf life is desired, it is preferred to add to the basic formulation a minor amount, usually on the order of about 0.1 to 1.0 of a polymerization inhibitor such a hydroquinone, a hindered phenol, acetylacetonate, or the like. In such fashion stable lives of up to as long as a year can be attained.

By variations of the proportions of the components within the above limits, the physical character of the basic adhesive in the uncured state can be varied considerably, from a flowable liquid to a thick, highly viscous mass which is not readily susceptible to flow. Further control of such properties, as well as characteristics after cure may be attained by ancillary, or secondary additives, such as fillers, dyes, pigments, plasticizers, extenders, autioxidants, ultraviolet light stabilizers, and the like. Such materials will generally be limited in proportion to less than 100 weight percent, based on the weight of the basic adhesive composition.

THE INITIATOR COMPOSITION

Since the adhesive is stable and non-curing in the absence of an activator or initiator for the free radical catalyst system, a separate formulation of an appropriate activator is necessary for use of the adhesive. Desirably the activator component will be a tertiary amine, such as N,N-dimethyl aniline, N,N-diethyl aniline, N,N-dimethyl-p-toluidine, and the like. The activator may be supplemented by accelerators which function to increase the reaction rate of the adhesive cure. Such accelerators are most conveniently a source of a heavy metal, such as copper, iron, cobalt, manganese, lead, and the like, most desirably as an organo-metallic compound or salt wherein the heavy metal is oxidizable, i.e., not in its highest oxidation state.

The activator and (optional) accelerator selected for use will be formulated into a composition suitable for application to a substrate to be bonded with the adhesive. Activation of the free radical catalyst occurs upon contact of the adhesive with the activator, and by the use of such a system, no mixing or compounding of ingredients is required at the time and place of use.

Generally it will be preferred to formulate the activator (and accelerator) as a solution or dispersion in a volatile liquid carrier medium to facilitate application to the substrate. The solution or dispersion of the bonding activator or initiator in the solvent then can be applied, as by brushing, spraying, or the like, upon at least one surface to be bonded, and the solvent allowed to evaporate leaving a deposit of bonding activator (and, optionally, accelerator) on the surface. Because of the extremely rapid cure speed attainable from such a technique, it is usually preferable to apply the activator to only one of each pair of mating surfaces to be bonded, affording a slightly longer opportunity to manipulate and adjust the parts. It is however, quite possible to apply the accelerator/activator combination or activator along to each surface, then apply the adhesive to one or each, and then mate the surfaces. Such an operation offers some advantages, most notably a more uniform polymerization pattern, minimizing stresses in the bond and consequently stronger bonds. When the activator formulation is applied to only one surface, and the adhesive to the other, it is readily apparent that the adhesive activation does not occur until the mating surfaces are joined and the activator and the adhesive are brought into contact.

Instead of dissolving the activator (and accelerator) in a solvent, it may be formulated into a composition, similar to the adhesive formulation of the elastomer and monomers, but without the peroxide catalyst. This activator/accelerator composition is less toxic since the concentration of tertiary amine is lessened as compared with the solution thereby decreasing the rate of absorption into the skin. In addition, the rate of volatilization is decreased, which may be desireable in certain applications. In this modification the activator/accelerator likewise can be applied to only one of the pair of mating surfaces or to both, as set forth in the preceding paragraph.

There is no necessity for mixing or combining the adhesive and its initiator or activator component, as the simple surface contact afforded by the foregoing procedure is fully adequate for the attainment of a full cure, even in the case of relatively thick layers of the adhesive. This is believed to be because the activation of the free radical catalyst system is transmitted as a "chain reaction" throughout the adhesive composition. Thus, while economics will ordinarily dictate the employment of the minimum amount of the adhesive necessary to attain a suitable bond, there are no limitations on the thickness of the adhesive bonding layer which may suitably be employed, although thickness will influence the cure rate.

In choosing the solvent for dissolution or dispersion of the bonding activator and accelerator, a solvent with a rapid rate of evaporation is desirable. This reduces the possibility of trapping solvent in the bonding activator (and accelerator)-adhesive system during the bonding operation (which may tend to weaken the bond), and also avoids unnecessary delays to allow the solvent to evaporate before completing the bonding operation. While a large number of solvents are available for this purpose, the ones which have been found most useful are halogenated hydrocarbons, particularly chlorinated and/or fluorinated hydrocarbons, such as methylene chloride, trichloroethane, methylchloroform, and trichloromonofluoromethane, and lacquer type solvents, such as acetone, methyl ethyl ketone, methyl isobutyl ketone, and ethyl acetate. Other acceptable solvents are xylene, benzene and toluene. Nearly all of these solvents, and particularly the halogenated hydrocarbons, produce a secondary benefit in that they can serve to clean the area of the surface which is to be bonded, thus reducing the chance of weak bond formation.

Frequently a small amount of a second, or "mutual," solvent can be added to the system in order to aid in solubilizing or dispersing the bonding activator/accelerator. Since nearly all of the bonding activator/accelerator disclosed herein are soluble in alcoholic-type solvents, such as ethyl alcohol, methyl alcohol, butyl alcohol and isopropyl alcohol, these have been found particularly adaptable to use as mutual solvents. Since many of these mutual solvents do not vaporize with the rapidity of the primary solvents, they should be used in as small an amount as possible, consistent with dissolving or dispersing the bonding activator/accelerator. Preferably, the amount of mutual solvent should not exceed 15 percent by weight of the total amount of solvent in the system.

The amount of the bonding activator/accelerator composition used in the solvent is limited only by its solubility characteristics in the solvent chosen. However, it is desirable to use a concentration which will produce optimum results during normal usage. If too little activator/accelerator is applied, a maximum speed of cure will not be achieved. If excessive activator/accelerator is applied, the activator/accelerator can form a barrier to effective contact between the adhesive and the surface to be bonded, thus reducing the ultimate strength of the bond which is formed. Based on the method of common usage of such products, it has been found preferable to use an activator/accelerator concentration in the solvent of between about .01 percent and about 10 percent by weight, and preferably between about 0.2 percent and about 5.0 percent by weight.

The most highly preferred method of applying the bonding activator/accelerator dissolved in a solvent to the surface is from an aerosol container. In this manner a thin uniform film of the bonding activator/accelerator is easily applied to the surface, and the maximum rate of solvent vaporization is achieved. Furthermore, more highly volatile solvents can be used under aerosol conditions than can be used conveniently in standard atmospheric pressure containers. Typical solvents within this category are dichlorodifluoromethane, vinyl chloride, and monochlorodifluormethane. Upon release from the aerosol container, these solvents will evaporate exceedingly rapidly and thus shorten the time period between application of the bonding activator/accelerator and completion of the bonding operation.

The amount of bonding activator/accelerator to be applied to a given surface should be no more than necessary to obtain efficient acceleration of the bonding operation. Excess activator/accelerator on one or more of the bonded surfaces can affect adversely the strength of the final bond. Further, when the amount of bonding activator/accelerator exceeds about 20 percent by weight of the adhesive used, little if any additional increase in speed is noted. Generally, an amount of bonding activator/accelerator equal to from about 0.05 to about 1.0 percent by weight of the adhesive is adequate. While it is not easy to determine the amount of activator/accelerator applied to a given surface, adequate results are obtained with the single application, by aerosol or otherwise, of a thin film of the activator/accelerator dissolved or dispersed in the appropriate solvent to the surfaces to be bonded. A suitable range of thicknesses is from about 0.00001 to 0.0005 inches with about 0.00005 to 0.0001 inches being preferred.

When the bonding activator/accelerator has been applied to the surface and the solvent, if any, has been allowed to evaporate, the bonding operation can proceed in the normal manner. The adhesive can be applied either to the surface which has been treated with the bonding activator/accelerator or to the appropriate mating surface. Customarily, as with most bonding operations, a thin film of adhesive is most desirable. The two mating surfaces are then placed in abutting relationship, and, preferably, a moderate compressive force is applied to produce a relatively thin layer of adhesive between the two surfaces, spread the adhesive evenly between the surfaces, and thus maximize the bonding efficiency. Typically a thickness of adhesive between the surfaces of from about 0.0003 inch to about 0.040 inch is desirable. Such thicknesses generally can be achieved with the adhesives disclosed herein by the application of contact pressure, or if desired, a moderate compressive force, such as of from about 5 to about 50 pounds per square inch. Where the activator/accelerator consists of a solution of activator dissolved in a composition consisting of a non-reactive elastomer and acrylic monomers, the thickness of activator/accelerator may range as high as 0.040 inches to as low as about 5% of the thickness of the adhesive.

The time required for ahdesive bonds in accordance with the present invention to set can be varied by appropriate selection of film thickness of the adhesive, catalyst, catalyst activator, accelerator, and the proportions thereof. If desired, set times of one second or even less, more frequently 10 seconds, may be attained, ranging upward to substantially as long a period as desired. Ordinarily, it will be preferred that set times be controlled to with a range of about 30 to 600 seconds, more preferably still about 30 to 120 seconds in the case of films of 1 mil or more. With thinner films, set times of 1 second or less, more frequently about 5–10 seconds are preferred. Extremely rapid curing formulations may have limited shelf life, but can be adequately handled and stored if refrigerated.

Bond strengths attained by the cured adhesive of the present invention are exceptional, both in shear strength and peel strength, to a wide diversity of substrates. In many cases it has been found possible to attain bonds having shear strengths greater than the coherent shear strength of the substrate. This is particularly true in the case of wood, glass, natural and synthetic rubber, and polyvinyl chloride. In some circumstances such results have been attained with other substrates, such as mild steel and the like. Bond shear strengths as high as about 4,000 p.s.i. and peel strengths of as high as about 90 p.l.i.

have been attained, and in some cases have been even greater.

Among the substrates specifically evaluated to date, there may be mentioned steel, both clean and oily, as received from a mill, neither cleaned nor sanded, aluminum, wood, glass, polyvinyl chloride, nylon, polystyrene, glass-reinforced polyester, polyester films, such as Mylar, surface activated polyolefins and poly (tetrafluoroethylene), such as Teflon, ABS, natural rubber, SBR rubber, neoprene rubber, hot galvanized steel, electrogalvanized steel. Bond strengths in shear qualify as very high with all these materials except hot galvanized although the results attained with this substrate are better than is normally attained in the art.

Peel strength of the adhesive bonds formed in accordance with the present invention is exceptionally high, surprisingly so in combination with the high shear strength of the bonds, as these two measures of bond strength properties are ordinarily considered mutually conflicting, in the sense that improvement in one is normally at the expense of the other. Bond peel strength values for the adhesive formulated and applied in accordance with the present invention range from 25 to 90 pounds per linear inch, at a rate of 0.1 inch per minute.

It has been found that the excellent bond characteristics attained by the adhesive of the present invention are rapidly degraded at temperatures above 150° C. When service is contemplated for environments below this temperature, such heat sensitivity is of little consequence and can generally be ignored. For applications where temperature exposure of 150° C. or above, even for relatively brief periods of 15 to 20 minutes, as in industrial paint-baking procedures or the like, is contemplated, it is necessary to add to the basic adhesive formulation a high temperature bond stabilizer comprising about 2 to 20, preferably about 5 to 15, and most preferably about 6 to 12, weight percent, based on the weight of the adhesive, of an epoxide resin not reactive with any component of the adhesive formulation at ambient temperatures.

Epoxide resins are also known as polyepoxide resins or epoxy resins and are characterized by having epoxy chemical groups,

wherein an oxygen atom is joined to each of two carbon atoms which are already united in some other way. Epoxy resins which contain the epoxy groups can be saturated or unsaturated, aliphatic cycloaliphatic, aromatic or heterocylic and can be substituted, if desired, with other substituents, such as chlorine atoms, hydroxyl groups, ether radicals, and the like. They can also be monomeric or polymeric. Other examples of epoxy resins include epoxidized esters of unsaturated monocarboxylic acids, epoxidized esters of unsaturated monohydric alcohols and polycarboxylic acids, epoxidized esters of unsaturated alcohols and of unsaturated carboxylic acids, epoxidized polymers and copolymers of diolefins, and the like. Epoxy resins preferred for use in the present invention include glycidyl esters and glycidyl ethers. Specific epoxy resins especially preferred in the present invention include diglycidyl ethers of bisphenol A both alone and diluted with other glycidyl ethers such as butyl glycidyl ether or phenol glycidyl ethers; epoxidized oils such as epoxidized soybean oil and the diglycidyl ester of linoleic acid; the triglycidyl ethers of glycerol and trimethylolpropane, triglycidyl p-aminophenol and, specifically, materials such as 3,4-epoxy-6-methylcyclohexylmethyl-3,4-epoxy-6-methylcyclohexane carboxylate and 3,4-epoxycyclohexylmethyl-3,4-epoxycyclohexane carboxylate and bis (3,4-epoxy-6-methylcyclohexylmethyl) adipate.

EXAMPLE I

33 Grams of a high acrylonitrile/butadiene rubber, Hycar 1431, a commercially available product of B. F. Goodrich Co., Inc., was dissolved in a mixture of 33 grams of acrylic acid and 34 grams of methyl methacrylate. Thereafter 5 grams of benzoyl peroxide and 0.1 gram of hydroquinone were dissolved in the solution.

The foregoing solution was applied at a 10 mil thickness to an oily steel specimen (as received from the mill, not cleaned or sanded). Dimethyl aniline was applied to a similar steel specimen in an amount to form a layer 0.05 mil thick. The two pieces of steel were then joined with a light pressure by placing one on top of the other, the weight of the steel being 4 grams/sq. in. The time was noted when it was no longer possible to move the two pieces relative to one another by bond, and was designated as the "set time" for the bond.

The set time was 60 to 75 seconds, the shear strength was 2900 p.s.i. (0.2 in./min.) and the peel strength was 25–35 p.l.i. (6 in./min.).

Additional samples were coated in a similar manner and heated various temperatures where they were maintained for 20 minutes and then allowed to cool to ambient temperatures, to simulate a paint bake cycle. The shear strength of each sample was then ascertained. Table I sets forth the results of these tests.

Table

| Run | 1 | 2 | 3 | 4 | 5 | 6 |
|---|---|---|---|---|---|---|
| Baking Temp ° C | 25 | 75 | 125 | 150 | 175 | 200 |
| Bond strength (psi) | 2900 | 2700 | 1900 | 1750 | 390 | 100 |

It will be observed that each of the samples 3 to 6 show at least some degradation, but the values are adequate for most utilities for baking temperatures of 150° C. and lower. However, for some purposes the shear values even at 200° C. would be useful.

The same formulations and the same procedure were employed (at ambient temperature) with a plurality of different substrates. The results are shown in Table II.

Table II

| Substrate | Bond Value (PSI Shear) |
|---|---|
| Aluminum/Aluminum | 1150 |
| Wood/Wood | 1100* |
| Steel/Glass | 1000* |
| Steel/Rigid PVC | 1000* |
| Steel/Glass Reinforced Polyester | 1700* |
| Steel/Nylon | 900* |
| Steel/Polystyrene | 500* |
| Steel/ABS | 800* |
| Wood/ABS | 800* |
| Steel/Rubber Gasket | 300* |
| Hot Dipped Galvanizing Steel/Steel | 380 |
| Electro Galvanized Steel/Steel | 1100 |
| Tinplate/Steel | 1200* |
| Glass/Plexiglass | 1000* |

*Substrate broke.

EXAMPLE II

The procedure of Example I was repeated utilizing oily steel substrates, ambient temperature and varying the adhesive formulation by substituting different nonreactive elastomers for Hycar 1431. All other components of the adhesive remained the same as did the activator composition and the ratio of components. The results are given in Table III.

Table III

| Elastomer | | Shear Value on Steel (PSI) | Set Time Seconds |
|---|---|---|---|
| Name | Description | | |
| Hycar 1072[1] | Carboxy modified medium high acrylonitrile/butadiene | 3100 | 60–75 |
| Hycar 4041[1] | Polyacrylic rubber | 2500 | 150–175 |
| Hycar 4043[1] | Polyacrylic rubber | 500 | 150–175 |
| Hydrin 200[2] | Polyether rubber based on epichlorohydrin | 3000 | 40–60 |
| Hydrin 100[2] | Polyether rubber based on epichlorohydrin | 2800 | 40–60 |
| Hycar 1442[1] | Medium high butadiene/acrylonitrile | 400 | 60–75 |
| Ameripol 1022[3] | Medium high butadiene/styrene | 2100 | 60–75 |

[1]Hycar 1072, 4041, 4043 and 1442 are commercially available products of B.F. Goodrich Co., Inc.
[2]Hydrin 100 and 200 are commercially available products of B.F. Goodrich Co., Inc.
[3]Ameripol 1022 is a commercially available product of B.F. Goodrich Co., Inc.

EXAMPLE III

The procedure of Example I was repeated using oily steel substrates, ambient temperature and employing Hycar 1072 in varying percentages ranging from 10% to 30% by weight. The acrylic acid content was maintained at 30% by weight in all cases, with the remainder being methyl methacrylate. To 100 parts of the mixture, 5 parts of benzoyl peroxide was added. Adhesive thickness was about 6 mils in all cases, and the shear values varied, as did the viscosity, directly with the percentage of Hycar 1072 present. The results are shown in the following Table IV.

Table IV

| Run | 1 | 2 | 3 | 4 | 5 |
|---|---|---|---|---|---|
| % Hycar 1072 | 10 | 15 | 20 | 25 | 30 |
| Shear Value (PSI) | 1200 | 1660 | 2200 | 2800 | 3050 |
| Viscosity (cps.) | 380 | 2200 | 18000 | 52000 | 180,000 |

EXAMPLE IV

The procedure of Example 3 was repeated except that 10% acrylic acid was employed instead of 30%, the remainder being methyl methacrylate. The results are shown in the following table:

Table V

| Run | 1 | 2 | 3 | 4 | 5 |
|---|---|---|---|---|---|
| % Hycar 1072 | 10 | 15 | 20 | 25 | 30 |
| Shear (PSI) | 1200 | 1250 | 2200 | 2000 | 1700 |
| Viscosity (cps.) | 333 | 2040 | 16800 | 57600 | 181600 |

EXAMPLE V

The procedure of Example I was repeated, except that n-butyl methacrylate was substituted for methyl methacrylate and the test was conducted at ambient temperature. The bond values in this test were; shear, 3000–3500 p.s.i.; peel strength, 25–35 p.l.i.; set time, 240 seconds.

EXAMPLE VI

The following example compares the reaction time and bond strengths obtained using acrylic and methacrylic acids.

The procedure of Example I was repeated substituting the acid shown in the run for the acrylic acid of Example I, and conducted at ambient temperature.

The following table sets forth the results:

Table

| Run | Parts Acid | | Set Time (Seconds) | Bond value Shear (PSI) |
|---|---|---|---|---|
| | Acrylic | Methacrylic | | |
| 1 | 0 | 30 | 1200+ | 600 |
| 2 | 5 | 25 | 1200+ | 1320 |
| 3 | 10 | 20 | 90–100 | 2300 |
| 4 | 15 | 15 | 60–75 | 2800 |
| 5 | 30 | 0 | 60–75 | 3600 |

This indicates that acrylic acid alone, or higher concentration of acrylic acid in the acid mixture results in faster reaction times and better bond strength, and are preferred in the two liquid formulation of this invention.

EXAMPLE VII

Improved heat resistance is obtained by incorporating an epoxy resin such as Epon 1004 (a commercially available product of Shell Oil Co.), DER 664 (a commercially available product of Dow Chemical Company), in the formulation in an amount about equal to that of the acid. The epoxy resin employed was EPON 1004 and the formulation employed was 33 grams Hycar 1431, 10 grams acrylic acid, 10 grams epoxy resin and 47 grams methyl methacrylate. The shear strength obtained with this formulation, following the general procedure of Example I, was compared with the results obtained with a control formulation which differed in having no epoxy and 57 grams of methyl methacrylate. Dimethylaniline was the accelerator in both cases.

In the shear test, the bond values were determined by heating at the indicated temperature for 20 minutes, then cooling to room temperature and determining the shear strength at failure.

The results of the test were as follows:

Table VII

| Run | Shear Values (PSI) | | | | | |
|---|---|---|---|---|---|---|
| | 1 | 2 | 3 | 4 | 5 | 6 |
| Temp. (C°) | 25 | 75 | 125 | 150 | 175 | 200 |
| Control | 2950 | 2800 | 2050 | 2000 | 520 | 160 |
| Epoxy Additive | 2950 | 2825 | 2700 | 2200 | 1875 | 1150 |

EXAMPLE VIII

Acrylic and methacrylic acids have sharp, pungent odors which affect the acceptability of the composition. To reduce the odor, half esters of 2-hydroxyethyl acrylate with maleic anhydride, itaconic acid, fumaric acid, oxalic acid, terephthalic, acid and phthalic acid were substituted for acrylic acid and methacrylic acid of the previous example. All the half esters are soluble in the monomer/polymer system used. The formulation employed was 30% Hycar 1431, 30% acid, 35% methyl methacrylate and 5% benzoyl peroxide. Dimethylaniline was used as the activator.

The shear test was determined at ambient temperature as set forth in Example I, and the odor was evaluated subjectively on a scale of 0 to 10, with 10 being the best and 0 the worst.

Table VIII

| Run | Acid | Set Time (Seconds) | Shear (PSI) | Odor |
|---|---|---|---|---|
| 1 | Acrylic | 60–75 | 2900 | 0 |
| 2 | Methacrylic | 1200+ | 600 | 1 |
| 3 | Phosphoric | 1200+ | 60 | 10 |
| 4 | Citric | 1200+ | 480 | 10 |
| 5 | Benzoic | 1200+ | 520 | 10 |
| 6 | Maleic Anhydride* | 1100 | 2100 | 9 |
| 7 | Itaconic* | 1150 | 2100 | 9 |
| 8 | Fumaric* | 950 | 2200 | 9 |
| 9 | Oxalic | 758 | 2180 | 9 |
| 10 | Terephthalic* | 650 | 2280 | 9 |
| 11 | Phthalic* | 710 | 2050 | 9 |

Odor of O is worse; 10 is best (least offensive)
*Half ester of 2-hydroxyethyl acrylate This test shows the marked improvement in odor obtained with the half-esters employed.

Instead of the two-liquid adhesive composition described above, wherein the adhesive is applied to one of surfaces to be joined and the activator is applied to a mating surface, a one-liquid adhesive composition may be formulated having the same active components. In the one-liquid formulation, the activator is encapsulated in an insoluble rupturable microsphere and dispersed in the liquid adhesive. Only one bonding surface is coated and on mating with the other surface and applying pressure, the microspheres rupture thereby releasing the activator. Strong bonds rapidly develop with high sheer and peal strength values. The adhesive composition, activator and (optional) accelerator are respectively of the same general class in both the one-liquid and two-liquid formulations.

The activator and (optional) accelerator selected for use in the one-liquid formulation is encapsulated in a microsphere which is then dispersed in the adhesive solution. In the absence of other ingredients, the density of microspheres containing the amine activator (beads) is less than the adhesive due to the fact that the amine is significantly lighter. For example, the density of dimethyl-p-toluidine is 0.9366g/cc while, in a typical formulation, the adhesive is about 1.18g/cc. To avoid having the beads float on the surface of the adhesive, a denser material is incorporated. This may be a pigment such as titanium dioxide or a dense solvent such as a perhalogenated hydrocarbon. If heavy metal salt accelerators are employed, these can serve as the densifiers. In any event, sufficient densifying material is incorporated to result in a bead density equal to that of the adhesive solution, so that the beads will stay suspended therein. For example, tetrachloroethylene with a density of 1.624 may be combined with the dimethyl-p-toluidine in a ratio of 35/65 to yield a solution having the density of 1.18.

The amount of beads present in the adhesive composition may vary within wide limits. Generally, when the amount of activator exceeds about 20% by weight of the adhesive solution, little, if any, increase in bonding speed is noted.

The concentration of activator which has been found satisfactory ranges from about 1 to 20 weight percent with from about 4 to 7 weight percent being preferred.

The bead concentration in the adhesive composition will depend on the percentage of the tertiaryamine in the microsphere and the weight percent of activator in the adhesive composition. Thus, with an encapsulated tertiary amine having 90% amine, a useful range has been found to be 4.5 to 7.5 wt. percent with a 67% tert. amine concentration 6–10 wt. percent is satisfactory.

Generally a bead concentration of a broad range of 1.1 to 30.0 wt. percent may be used with a preferred range of about 4.4 to 11.2 wt. percent.

THE MICROSPHERES

Since the microspheres are to be suspended in the adhesive solution in order to have a long shelf life and a long pot life, it is essential that they be substantially insoluble in the adhesive solution. The current state of the microencapsulation art is well developed and a large number of polymeric materials have been employed as the microsphere wall structures.

An overview of microencapsulation including a listing of typical wall material for microspheres and the various methods devised for producing the microspheres are found in the article entitled, "Microencapsulation" in the Kirk-Othmer Encyclopedia of Chemical Technology, Second Edition, 1967, pp. 436–455, Wiley and Sons publishers, New York, N.Y. This article is hereby incorporation by reference.

It is difficult to predict with certainty whether a particular microsphere wall or shell composition will be soluble or insoluble in a particular adhesive composition and, if soluble, to what extent. Hence, for any given adhesive composition, the proposed microsphere must be tested to determine its solubility therein. We have found that a microsphere having a wall or shell composition consisting of a formaldehyde cross-linked gelatin and encapsulating an activator amine is sufficiently insoluble in adhesive compositions containing methacrylic acid as the sole polymerizable acid monomer to result in an one-liquid adhesive having a shelf life and pot life of more than 60 days.

The same adhesive solution having solely acrylic acid as the acid component in an amount of about 30%, with the same microsphere, has a shelf life of, at most, about 2½ hours. However, by reducing the amount of acrylic acid in the adhesive solution to less than 10%, a longer pot life of useful duration can be obtained. The acrylic acid may be the sole acid monomer, or it may be used in conjunction with methacrylic acid; but in either case, the maximum content in the composition should not be greater than 10% for long shelf life. However, for certain applications percentages greater than 10% may be found useful.

Bead sizes which have been employed range from 10 to 1200 microns in diameter. In general the smaller diameter beads use more desireable, since less problems are presented thereby in obtaining thin adhesive layers. However, preparation of beads at the lower end of the size range presents problems in purification and as a result are more expensive. We have found that beads in the 200 to 600 micron diameter range are the most practical because of their ease of preparation, and because by suitable methods thin adhesive layers readily may be made from compositions containing beads of this size range. However, larger bead sizes may also be employed and with proper precautions excellent adhesion may likewise be obtained.

The time required for adhesive bonds, in accordance with the present invention to set can be varied by appropriate selection of the film thickness, the adhesive dispersion, the catalyst, catalyst activator, accelerator and proportions thereof. Ordinarily, setting times of 15 to 900 seconds would be desireable with 120 to 400 seconds as the preferred range. The film thickness of adhesive as applied may vary from 0.5 mils to 40 mils with 4 mils to 7 mils being preferred for beads in the 200-600 micron range.

In applying thin film thickness of adhesive where beads of 200 to 600 microns are employed in the composition, the beads must be broken before applying the adhesive to the surface. Otherwise, the beads could be removed from the adhesive composition by the means employed to spread the film to a desired thickness. To illustrate this technique, in applying a half-mil thick film of the one liquid adhesive, a set of nip rolls was used set at a 6 mil opening. The adhesive was squeezed through the nips, rupturing the capsules. The thickness was metered by drawing a metal sheet under the nip roll at a speed necessary to produce a half mil layer of adhesive.

Another method which may be employed is to pass the adhesive through a gear pump where the beads are ruptured by the action of the gears. A third technique employed was to apply a metered 24 mil layer (or 600 microns) so that all the beads are on the substrate, apply pressure to rupture the beads, and then attenuate the layer to the desire film thickness. Excess adhesive is avoided by applying the adhesive in a thin strip, and controlling the thickness by shim stock.

Thick layers, larger than the particle size of the beads, are made by pre-crushing the beads using rolls, gear pumps or other means, and spreading over the substrate to the desired thickness by flowing trowelling or other means. Alternatively the adhesive composition may be spread on a surface, the other surface brought in contact to crush the beads, and then the surfaces spread apart to the desired thickness. In particular applications the method of pre-breaking the microspheres is highly useful since it allows greater variation in, and control of, the thickness of the adhesive layer.

High bond shear strengths and peel strengths are obtained using the one-liquid adhesive dispersion of this invention for a wide variety of substrates; such as steel, aluminum wood, glass, polyvinyl chloride, nylon, polystyrene, glass-reinforced polyester, polyester films; such as, Mylar, surface activated polyolefins and poly (tetrafluoroethylene); such as, Teflon, ABS, natural rubber, SBR rubber, neoprene, hot galvanized steel and electrogalvanized steel.

EXAMPLE IX

An adhesive composition (in parts by weight) consisting of 23 parts Hycar 1431, 10 parts acrylic acid (or 10 parts methacrylic acid), 54 parts methyl methacrylate, 5 parts benzoyl peroxide and 0.1 parts hydroquinone was mixed with 2-5 parts of formaldehyde cross-linked gelatin microspheres encapsulating N,N-dimethyl-p-toluidine (DMPT). The microspheres comprised 90% DMPT.

The following Table lists the results:

Table IX

| Acid | shelf life (months) | Bond Value (PSI-shear) | (PSI-Peel) | Set Time (seconds) |
|---|---|---|---|---|
| Acrylic (10%) | 2.5 | 3000 | 25-35 | 60-75 |
| Methacrylic (10%) | 6+ | 2000 | 20-30 | 300-600 |

Results similar to those in Table 9 were obtained using microspheres containing the activator dissolved in perchlorethylene and encapsulated to form microspheres equal in density to the adhesive. Flotation of the microspheres in the adhesive was prevented thereby.

What is claimed:

1. A method of adhesively joining a pair of mating surfaces comprising applying to at least one of said mating surfaces a composition comprising a free radical additional polymerization catalyst activator in a sufficient amount to activate a free radical addition polymerization catalyst by contact,
   said activator composition being free of any free radical catalyst,
   applying to at least one of said mating surfaces an activatable, curable adhesive comprising a solution of a nonreactive elastomeric polymer selected from the group consisting of homopolymers and copolymers of butadiene and lower alkyl substituted butadienes, copolymers of styrene or acrylonitrile or methylmethacrylate with butadiene or lower alkyl substituted butadienes, carboxy modified acrylonitrile-butadiene copolymers, neoprene, butyl rubber, silicones other than dimethyl silicone, polysulfide rubber, pyridine-butadiene copolymer, chlorosulfonated polyethylene, polyethers of epichlorhydrin, and the said polymers and copolymers having vinyl group-containing monomers grafted thereon,
   said elastomeric polymer being dissolved in a free radical addition polymerizable acrylic monomer and a free radical addition polymerizable acid monomer co-polymerizable with said acrylic monomer,
   said solution containing a catalytically effective amount of a non-activated free radical addition polymerization catalyst having a half-life of at least about ½ hour at 85° C.,
   joining said pair of mating surfaces in a contact relationship, and maintaining said contact relationship until said adhesive cures to a set.

2. The method of claim 1 wherein the free radical addition polymerization activator is dissolved in a volatile solvent.

3. The method of claim 1 wherein the free radical addition polymerization activator is dissolved in a composition consisting essentially of a non-reactive elastomeric polymer, a free radical addition polymerizable acrylic monomer, and a free radical addition polymerizable acid monomer co-polymerizable with said acrylic monomer.

4. The method of claim 1 wherein the non-reactive elastomeric polymer is selected from group consisting of, poly (butadiene-styrene), polyacrylate, poly (ethers of epichlorhydrin), poly (butadiene - styrene acrylonitrile), and carboxy modified acrylonitrile-butadiene rubbers, and mixtures thereof.

5. The method of claim 1 wherein said adhesive comprises from about 10 to 70 weight percent of said elastomeric polymer resin, from about 5 to 67 weight percent of said acrylic monomer, from about 5 to 67 weight percent of said acid monomer, and about 0.1 to 5.0 weight percent of said polymerization catalyst.

6. The method of claim 1 wherein said adhesive comprises from about 10 to 30 weight percent of said elastomeric polymer from about 30 to 50 weight percent of said acrylic monomer, from about 5 to 35 weight percent of said acid monomer, and about 2 to 4 weight percent of said polymerization catalyst.

7. The method of claim 1 wherein said acrylic monomer is selected from the group consisting of alkyl acrylate and alkyl methacrylate esters, acrylamide, methacrylamide, N-alkyl substituted amides, acrylonitrile, methacrylonitrile and mixtures thereof.

8. The method of claim 1 wherein said acid monomer is selected from the group consisting of acrylic acid, methacrylic acid, the hydroxyethyl acrylate half esters of maleic, itaconic, fumaric, oxalic, terephthalic, and mixtures thereof.

9. The method of claim 1 wherein said polymerization catalyst is benzoyl peroxide.

10. The method of claim 1 wherein said catalyst activator is selected from the group consisting of dimethyl aniline, diethyl aniline, N,N-dimethyl-p-toluidine, and mixtures thereof.

11. The method of claim 1 wherein said acrylic monomer is selected from the group consisting of methyl methacrylate, ethyl acrylate, n-butyl acrylate, acrylamide, methacrylamide, and mixtures thereof.

12. The method of claim 1 wherein said acid monomer is acrylic acid.

13. The method of claim 1 wherein said activator is applied in a volatile carrier solvent, and said solvent is evaporated prior to contacting said activator with said adhesive.

14. The method of claim 1 wherein said activator is admixed with a free radical addition polymerization accelerator.

15. The method of claim 14 wherein said accelerator comprises a heavy metal salt.

16. The method of claim 15 wherein said heavy metal salt is a salt of a heavy metal selected from the group consisting of copper, iron, cobalt, manganese, lead and mixtures thereof.

17. The method of claim 15 wherein said heavy metal salt is a naphthenate of a heavy metal.

18. The method of claim 15 wherein said heavy metal salt is a salt of a heavy metal at an oxidation state lower than its highest oxidation state.

19. The method of claim 1 wherein said mating surfaces are the same or different members of the group consisting of steel, aluminum, wood, glass, polyvinyl chloride, nylon, polystyrene, polyesters, glass-reinforced polyesters, ABS, natural rubber, SBR rubber, neoprene, rubber, polyolefins, polytetrafluoroethylene, and galvanized steel.

20. The method of claim 1 wherein said activator is applied to one of said pair of mating surfaces and said adhesive is applied to the second of said mating surfaces.

21. The method of claim 1 wherein said activator is applied in an amount sufficient to form a layer of from about 0.01 to 0.5 mils in thickness and said adhesive is applied in an amount sufficient to form a layer of from about 0.3 to 40 mils in thickness.

22. The method of claim 1 wherein said adhesive cures to a set in a period of from about 10 to 300 seconds.

23. The method of claim 1 wherein said acid monomer is selected from the group consisting of the hydroxyethyl acrylate half esters of maleic, itaconic, fumaric, oxalic, terephathalic, and mixtures thereof.

24. The method of claim 1 wherein said acid monomer comprises above 20 to about 30% methacrylic acid.

25. A method of adhesively joining a pair of mating surfaces comprising applying to at least one of said mating surfaces a free radical addition polymerization catalyst activator in a sufficient amount to activate a free radical addition polymerization catalyst by contact, applying to at least one of said mating surfaces an activatable, curable adhesive comprising a solution of a nonreactive elastomeric polymer resin selected from the group consisting of homopolymers and copolymers of butadiene and lower alkyl substituted butadienes, copolymers of styrene or acrylonitrile or methylmethacrylate with butadiene or lower alkyl substituted butadienes, carboxy modified acrylonitrile-butadiene copolymers, neoprene, butyl rubber, silicones other than dimethylsilicone, polysulfide rubber, pyridine-butadiene copolymer, chlorosulfonated polyethylene, polyethers of epichlorhydrin, and the said polymers and copolymers having vinyl group-containing monomers grafted thereon, and an epoxide resin, said elastomeric polymer and epoxy resin being dissolved in a free radical addition polymerizable acrylic monomer and a free radical addition polymerizable acid monomer copolymerizable with said acrylic monomer, said solution containing a catalytically effective amount of a non-activated free radical addition polymerization catalyst having a half-life of at least about ½ hour at 85° C., said epoxide resin being non-reactive with any other component of the adhesive at ambient temperatures.

26. The method of claim 25 wherein the non-reactive elastomeric polymer is selected from group consisting of, poly (butadiene-styrene), polyacrylate, poly (ethers of epichlorhydrin) poly (butadiene-styrene acrylonitrile), and carboxy modified acrylonitrile-butadiene rubbers, and mixtures thereof.

27. The method of claim 25 wherein said adhesive comprises from about 10 to 70 weight percent of said elastomeric polymer, from about 5 to 67 weight percent of said acrylic monomer, from about 5 to 67 weight percent of said acid monomer, from about 2 to 20 weight percent of said epoxy resin and about 0.1 to 5.0 weight percent of said polymerization catalyst.

28. The method of claim 25 wherein said adhesive comprises from about 10 to 30 weight percent of said elastomeric polymer, from about 30 to 50 weight percent of said acrylic monomer, from about 5 to 35 weight percent of said monomer, from about 6 to 12 weight percent of said epoxy resin and about 2 to 4 weight percent of said polymerization catalyst.

29. The method of claim 25 wherein said acrylic monomer is selected from the group consisting of alkyl acrylate and alkyl methacrylate esters, acrylamide, methacrylamide, N-alkyl substituted amides, acrylonitrile, methacrylonitrile and mixures thereof.

30. The method of claim 25 wherein said acid monomer is selected from the group consisting of acrylic acid, methacrylic acid, the hydroxyethyl acrylate half esters of maleic, itaconic fumaric, oxalic, terephthalic, and mixtures thereof.

31. The method of claim 25 wherein said polymerization catalyst is benzoyl peroxide.

32. The method of claim 25 wherein said adhesive is activatable by contact with a free radical addition polymerization catalyst activator.

33. The method of claim 32 wherein said catalyst activator is selected from the group consisting of dimethyl aniline, diethyl aniline, N,N-dimethyl-p-toluidine, and mixtures thereof.

34. The method of claim 25 wherein said acrylic monomer is selected from the group consisting of methyl methacrylate, ethyl acrylate, n-butyl acrylate, acrylamide, methacrylamide, and mixtures thereof.

35. The method of claim 25 wherein said acid monomer is acrylic acid.

36. The method of claim 25 wherein said acid monomer is selected from the group consisting of the hydroxyethyl acrylate half esters of maleic, itaconic, fumaric, oxalic, terephathalic, and mixtures thereof.

37. An activatable, curable adhesive comprising a solution of a non-reactive elastomeric polymer selected from the group consisting of homopolymers and copolymers of styrene or acrylonitrile or methylmethacrylate with butadiene or lower alkyl substituted butadienes, carboxy modified acrylonitrile butadiene copolymers, chlorosulfonated polyethylene, polyethers of epichlorhydrin, and the said polymers and copolymers having vinyl group-containing monomers grafted thereon,
said elastomeric polymer being dissolved in a free radical addition polymerizable acrylic monomer and a free radical addition polymerizable acid monomer co-polymerizable with said acrylic monomer,
said solution containing a catalytically effective amount of a non-activated free radical addition polymerization catalyst having a half-life of at least about ½ hour at 85° C.

38. The activatable, curable adhesive of claim 37 wherein said adhesive comprises from about 10 to 70 weight percent of said elastomeric polymer, from about 5 to 67 weight percent of said acrylic monomer, from about 5 to 67 weight percent of said acid monomer, and about 0.1 to 5.0 weight percent of said polymerization catalyst.

39. The activatable, curable adhesive of claim 37 wherein said adhesive comprises from about 10 to 30 weight percent of said elastomeric polymer, from about 30 to 50 weight percent of said acrylic monomer, from about 5 to 35 weight percent of said acid monomer, and about 2 to 4 weight percent of said polymerization catalyst.

40. The activatable, curable adhesive of claim 37 wherein said acrylic monomer is selected from the group consisting of alkyl acrylate and alkyl methacrylate esters, acrylamide, methacrylamide, N-alkyl substituted amides, acrylonitrile, methacrylonitrile and mixtures thereof.

41. The activatable, curable adhesive of claim 37 wherein said acid monomer is selected from the group consisting of acrylic acid, methacrylic acid, the hydroxyethyl acrylate half esters of maleic, itaconic, fumaric, oxalic, terephthalic, and mixtures thereof.

42. The activatable, curable adhesive of claim 37 wherein said polymerization catalyst is benzoyl peroxide.

43. The activatable, curable adhesive of claim 37 wherein said adhesive is activatable by contact with a free radical addition polymerization catalyst activator.

44. The adhesive of claim 43 wherein said catalyst activator is selected from the group consisting of dimethyl aniline, diethyl aniline, N,N-dimethyl-p-toluidine, and mixtures thereof.

45. The adhesive of claim 37 wherein said acrylic monomer is selected from the group consisting of methyl methacrylate, ethyl acrylate, n-butyl acrylate, acrylamide, methacrylamide, and mixtures thereof.

46. The adhesive of claim 37 wherein said acid monomer is acrylic acid.

47. The activatable curable adhesive of claim 37 wherein the non-reactive elastomeric polymer is selected from the group consisting of poly (butadiene), poly (butadiene-styrene), polyacrylate, poly (ethers of epichlorhydrin), poly (butadiene - styrene acrylonitrile), and carboxy modified acrylonitrilebutadiene rubbers, and mixtures thereof.

48. The adhesive of claim 43 wherein the solution has dispersed therein pressure rupturable microspheres having a shell composition substantially insoluble in said solution for a relatively long time period and having encapsulated therein a free radical addition polymerization catalyst activator to form a one-liquid activatable curable adhesive dispersion.

49. The adhesive of claim 76 wherein the non-reactive elastomeric polymer is selected from the group consisting of poly (butadiene-styrene), polyacrylate, poly (ethers of epichlorhydrin), poly (butadiene-styrene acrylonitrile), and carboxy modified acrylonitrile-butadiene rubbers, and mixtures thereof.

50. The adhesive of claim 43 wherein the solution has dispersed therein pressure rupturable microspheres having a shell composition substantially insoluble in said solution for a relatively long time period and having encapsulated therein a free radical addition polymerization acatalyst activator to form one-liquid activatable curable adhesive dispersion.

51. The adhesive dispersion of claim 50 wherein the acrylic monomer is selected the group consisting of methyl methacrylate, ethyl acrylate, n-butyl acrylate, acrylamide, methacrylamide and mixtures thereof, and said catalyst activator is selected from the group consisting of dimethyl aniline, diethyl aniline, N, N-dimethyl -p-toluidine, and mixtures thereof.

52. The adhesive dispersion of claim 51 wherein the acid monomer is selected from the group consisting of acrylic acid, methacrylic acid, the hydroxyethyl acrylate half esters of maleic, itaconic, fumaric, oxalic, terephthalic, and mixtures thereof.

53. The adhesive dispersion of claim 52 comprising from about 10 to about 70 weight percent of said elastomeric polymer, from about 5 to 67 weight percent of said acrylic monomer, from about 5 to 67 weight percent of said acid monomer, and about 0.1 to 5.0 weight percent of said polymerization catalyst and from about 1 to 20 weight percent of the microsphere encapsulated activator.

54. The adhesive dispersion of claim 53 comprising from about 10 to about 30 weight percent of said elastomeric polymer, from about 30 to 50 weight percent of said acrylic monomer, from about 5 to 35 weight percent of said acid monomer, and about 2 to 4 weight percent of said polymerization catalyst and from about 4 to 7 weight percent of the microspheres encapsulated activator.

55. The adhesive dispersion of claim 54 wherein the density of the microspheres and encapsulated activator is substantially equal to that of the adhesive solution of polymer and monomers.

56. The adhesive dispersion of claim 54 wherein the acrylic monomer is methyl methacrylate, the acid monomer is a member of the class consisting of methacrylic acid, acrylic acid and mixtures thereof, but wherein the acrylic acid does not exceed about 10 weight percent of the adhesive dispersion, and the pressure-rupturable microsphere consists of a spherule having a shell comprising a formaldehyde cross-linked gelatin.

57. The adhesive of claim 56 comprising about 33 parts by weight of acrylonitrile-butadiene elastomer, about 10 parts by weight of acrylic acid, about 54 parts by weight of methyl methacrylate, about 5 parts benzoyl peroxide and from about 2 to about 5 parts by weight of N,N-dimethyl-p-toludine as the activator encapsulated in a pressure rupturable microsphere having a shell comprising a formaldehyde cross-linked gelatin.

58. The adhesive of claim 56 comprising about 33 parts by weight of acrylonitrile-butadiene elastomer, about 10 parts by weight of methacrylic acid, about 54 parts by weight of methyl methacrylate, about 5 parts benzoyl peroxide and from about 2 to about 5 parts by weight of N,N-dimethyl-p-toludine as the activator encapsulated in a pressure rupturable microsphere having a shell comprising a formaldehyde cross-linked gelatin.

59. The method of adhesively fastening a pair of mating surfaces comprising: in any order, the steps of coating at least one of said mating surfaces with the one-liquid activatable curable adhesive dispersion of claim 48 rupturing the microspheres in said adhesive dispersion, and thereafter maintaining the surfaces in a contact relationship until said adhesive cures to a set.

60. The method of claim 59, comprising applying the adhesive dispersion of claim 48 to at least one of said mating surfaces and joining said surfaces together in a contact relationship with a force sufficient to rupture the microspheres in said adhesive dispersion.

61. The method of claim 59 comprising rupturing the microspheres in the adhesive dispersion of claim 48, thereafter applying said dispersion to at least one of said mating surfaces and joining the surfaces together in a contact relationship.

62. The method of claim 60 wherein the adhesive dispersion is that of claim 52.

63. The method of claim 60 wherein the adhesive dispersion is that of claim 53.

64. The method of claim 60 wherein the adhesive dispersion is that of claim 56.

65. The method of claim 61 wherein the adhesive dispersion is that of claim 52.

66. The method of claim 61 wherein the adhesive dispersion is that of claim 53.

67. The method of claim 61 wherein the adhesive dispersion is that of claim 56.

68. The activatable, curable adhesive of claim 37 wherein said acid monomer is selected from the group consisting of the hydroxyethyl acrylate half esters of maleic, itaconic, fumaric, oxalic, terephathalic, and mixtures thereof.

69. The adhesive of claim 38 wherein said acid monomer comprises above 20 to about 30 weight percent methacrylic acid.

70. An activatable, curable adhesive comprising a solution of a non-reactive elastomeric polymer resin selected from the group consisting of homopolymers of butadiene and lower alkyl substituted butadienes, copolymers of sytrene or acrylonitrile or methylmethacrylate with butadiene or lower alkyl substituted butadienes, carboxy modified acrylonitrile-butadiene copolymers, neoprene, butyl rubber, silicones other than dimethyl silicone, polysulfide rubber, pyridinebutadiene copolymer, chlorosulfonated polyethylene, polyethers of epichlorhydrin, and the said polymers and copolymers having vinyl group-containing monomers grafted thereon, and an epoxide resin,
said elastomeric polymer and epoxide resin being dissolved in a free radical addition polymerizable acid monomer copolymerizable with said acrylic monomer,
said solution containing a catalytically effective amount of a non-activated free radical addition polymerization catalyst having a half-life of at least about ½ hour at 85° C.,
said epoxide resin being non-reactive with any other component of the adhesive at ambient temperature.

71. The activatable, curable adhesive of claim 70 wherein the elastomic polymer is selected from the group consisting of poly (butadiene-styrene), polyacrylate, poly (ethers of epichlorhydrin), poly (butadiene - styrene acrylonitrile), and carboxy modified acrylonitrile-butadiene rubbers, and mixtures thereof.

72. The activatable, curable adhesive of claim 70 wherein said adhesive comprises from about 10 to 70 weight percent of said elastomeric polymer, from about 5 to 67 weight percent of said acrylic monomer, from about 5 to 67 weight percent of said acid monomer, from about 2 to 20 weight percent of said epoxy resin, and about 0.1 to 5.0 weight percent of said polymerization catalyst.

73. The activatable, curable adhesive of claim 70 wherein said adhesive comprises from about 10 to 30 weight percent of said elastomeric polymer, from about 30 to 50 weight percent of said acrylic monomer, from about 5 to 35 weight percent of said acid monomer, from about 6 to 12 weight percent of said epoxy resin, and about 2 to 4 weight percent of said polymerization catalyst.

74. The activatable, curable adhesive of claim 70 wherein said acrylic monomer is selected from the group consisting of alkyl acrylate and alkyl methacrylate esters, acrylamide, methacrylamide, N-alkyl substituted amides, acrylonitrile, methacrylonitrile and mixtures thereof.

75. The activatable, curable adhesive of claim 70 wherein said acid monomer is selected from the group consisting of acrylic acid, methyacrylic acid, the hydroxyethyl acrylate half esters of maleic, itaconic, fumaric, oxalic, terephthalic, and mixtures thereof.

76. The activatable, curable adhesive of claim 70 wherein said polymerization catalyst is benzoyl peroxide.

77. The activatable, curable adhesive of claim 70 wherein said adhesive is activatable by contact with a free radical addition polymerization catalyst activator.

78. The adhesive of claim 77 wherein said catalyst activator is selected from the group consisting of dimethyl aniline, diethyl aniline, N,N-dimethyl-p-toluidine, and mixtures thereof.

79. The adhesive of claim 70 wherein said acrylic monomer is selected from the group consisting of methyl methacrylate, ethyl acrylate, n-butyl acrylate, acrylamide, methacrylamide, and mixtures thereof.

80. The adhesive of claim 70 wherein said acid monomer is acrylic acid.

81. The adhesive of claim 70 wherein the solution has dispersed therein pressure rupturable microspheres having a shell composition substantially insoluble in said solution for a relatively long time period and having encapsulated therein a free radical addition polymerization catalyst activator to form a one-liquid activatable curable adhesive dispersion.

82. The method of adhesively fastening a pair of mating surfaces comprising, in any order, the steps of coating at least one of said mating surfaces with the one-liquid activatable curable adhesive dispersion of claim 81 rupturing the microspheres in said adhesive dispersion, and thereafter maintaining the surfaces in a contact relationship until said adhesive cures to a set.

83. The adhesive of claim 70 wherein said acid monomer is selected from the group consisting of the hydroxyethyl acrylate half esters of maleic, itaconic, fumeric, oxalic, terephthalic, and mixtures thereof.

* * * * *